US012415361B2

(12) United States Patent
Sekino et al.

(10) Patent No.: US 12,415,361 B2
(45) Date of Patent: Sep. 16, 2025

(54) LIQUID EJECTION DEVICE

(71) Applicant: SEIKO EPSON CORPORATION, Tokyo (JP)

(72) Inventors: Hirokazu Sekino, Chino (JP); Yuji Saito, Shiojiri (JP); Masaki Kato, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 251 days.

(21) Appl. No.: 18/303,786

(22) Filed: Apr. 20, 2023

(65) Prior Publication Data

US 2023/0339230 A1 Oct. 26, 2023

(30) Foreign Application Priority Data

Apr. 21, 2022 (JP) ................................ 2022-070379

(51) Int. Cl.
*B41J 2/165* (2006.01)

(52) U.S. Cl.
CPC ................................ *B41J 2/16552* (2013.01)

(58) Field of Classification Search
CPC .................................................... B41J 2/16552
See application file for complete search history.

(56) References Cited

U.S. PATENT DOCUMENTS

| | | | | |
|---|---|---|---|---|
| 6,386,949 | B1 | 5/2002 | Hagiwara et al. | |
| 9,925,779 | B2 * | 3/2018 | Shinbara | B41J 2/16535 |
| 2017/0225203 | A1 | 8/2017 | Kloepfer et al. | |

FOREIGN PATENT DOCUMENTS

| | | | | |
|---|---|---|---|---|
| JP | 2000-153247 | A | 6/2000 | |
| JP | 2005035117 | A * | 2/2005 | B41J 2/16585 |
| JP | 4270817 | B2 * | 6/2009 | B41J 2/03 |
| JP | 2017-177037 | A | 10/2017 | |
| JP | 2017-533095 | A | 11/2017 | |
| JP | 6517334 | B | 5/2019 | |
| JP | 2019172844 | A * | 10/2019 | A47L 11/30 |

* cited by examiner

*Primary Examiner* — Sharon Polk
(74) *Attorney, Agent, or Firm* — Harness, Dickey & Pierce, P.L.C.

(57) ABSTRACT

A liquid ejection device includes: a head unit having at least one nozzle and configured to eject a liquid containing a solvent and a cleaning agent from the nozzle; and a liquid transport tube configured to transport the liquid to the head unit. A content of the cleaning agent in the liquid is 1% by weight or more. The liquid is ejected from the head unit in a continuous flow, and the continuous flow is converted into droplets to collide with the object in a form of droplets.

9 Claims, 5 Drawing Sheets

LIQUID EJECTION DEVICE

The present application is based on, and claims priority from JP Application Serial Number 2022-070379, filed Apr. 21, 2022, the disclosure of which is hereby incorporated by reference herein in its entirety.

BACKGROUND

1. Technical Field

The present disclosure relates to a liquid ejection device.

2. Related Art

In related art, various liquid ejection devices, each of which ejects a liquid to an object, have been used. Among such liquid ejection devices, there is a liquid ejection device that ejects, from a head unit, a liquid for cleaning an attached matter attached to an object. For example, JP-T-2017-533095 discloses a high-pressure cleaning system including a high-pressure pump in order to increase an ejection pressure of a cleaning liquid, which is a liquid for cleaning an attached matter attached to an object, from an ejection unit.

However, in a related-art liquid ejection device in which the liquid for cleaning the attached matter attached to the object is ejected from a head unit as disclosed in JP-T-2017-533095, an ejection amount is too large, and thus a place where the liquid ejection device is to be used and application of the liquid ejection device are limited. On the other hand, in a related-art liquid ejection device in which a liquid such as water is ejected in a continuous flow from a head unit and the continuous flow is converted into droplets to collide with an object in a form of droplets, although an ejection amount can be reduced, a cleaning force at the time of cleaning an attached matter attached to the object may not be sufficient.

SUMMARY

According to an aspect of the present disclosure, there is provided a liquid ejection device including: a head unit configured to eject a liquid; and a liquid transport tube configured to transport the liquid to the head unit, in which the liquid contains a solvent and a cleaning agent having a stronger cleaning power for cleaning an attached matter attached to an object than the solvent, a content of the cleaning agent in the liquid is 1% by weight or more, and the liquid is ejected from the head unit in a continuous flow and the continuous flow is converted into droplets to collide with the object in a form of droplets.

DESCRIPTION OF EXEMPLARY EMBODIMENTS

Figure 1:
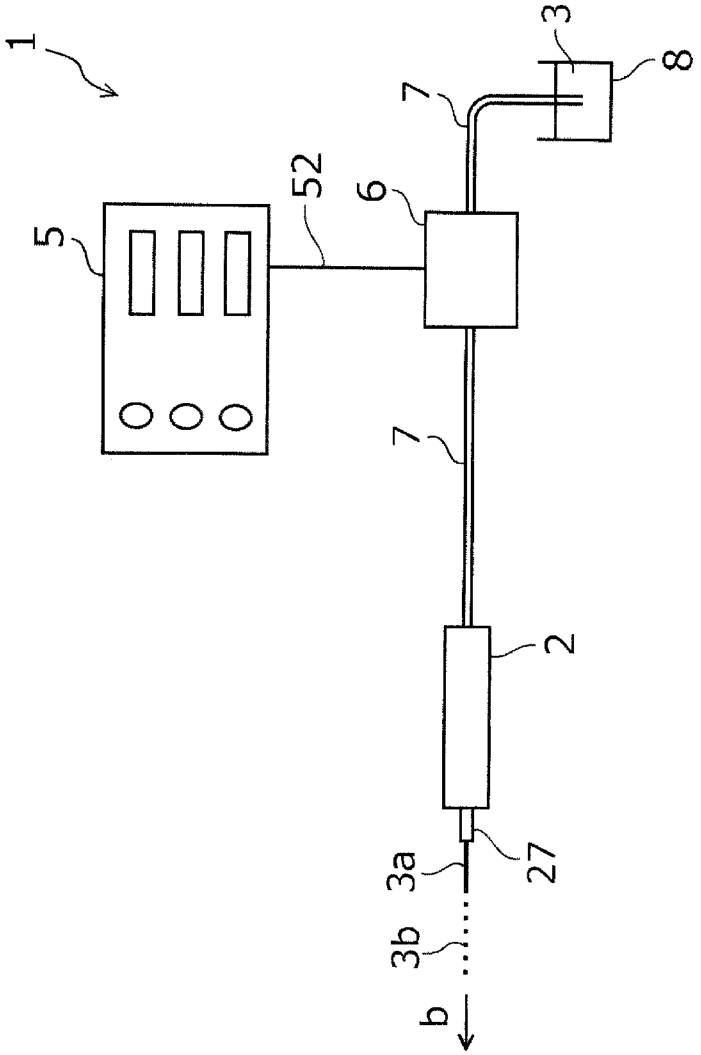
FIG. 1 is a schematic diagram showing a liquid ejection device according to a first embodiment.

First, the present disclosure will be schematically described.

According to a first aspect of the present disclosure, there is provided a liquid ejection device including: a head unit configured to eject a liquid; and a liquid transport tube configured to transport the liquid to the head unit, in which the liquid contains a solvent and a cleaning agent having a stronger cleaning power for cleaning an attached matter attached to an object than the solvent, a content of the cleaning agent in the liquid is 1% by weight or more, and the liquid is ejected from the head unit in a continuous flow and the continuous flow is converted into droplets to collide with the object in a form of droplets.

According to this aspect, the liquid is ejected from the head unit in the continuous flow, and the continuous flow is converted into droplets to collide with the object in the form of droplets. The liquid contains 1% by weight or more of the cleaning agent. Therefore, an ejection amount can be limited, and a cleaning effect can be improved by containing 1% by weight or more of the cleaning agent in the liquid.

The liquid ejection device according to a second aspect of the present disclosure is directed to the first aspect, in which the content of the cleaning agent in the liquid is 10% by weight or less.

According to this aspect, the content of the cleaning agent is 1% by weight or more and 10% by weight or less. The cleaning effect increases when the content of the cleaning agent is 1% by weight or more, but an effect of further improving the cleaning effect becomes lower once the content of the cleaning agent is more than 10% by weight. On the other hand, when the content of the cleaning agent is 10% by weight or less, it is possible to prevent a decrease in workability due to easiness of foaming caused by containing more than 10% by weight of the cleaning agent, an increase in a cost of the liquid, and the like.

The liquid ejection device according to a third aspect of the present disclosure is directed to the first or second aspect, and further includes: a liquid storage configured to store the liquid, in which the liquid transport tube transports the liquid from the liquid storage to the head unit.

According to this aspect, the liquid storage configured to store the liquid is provided, and the liquid transport tube transports the liquid from the liquid storage to the head unit. With such a configuration, a device configuration can be simplified, and an increase in a manufacturing cost of the device can be prevented.

The liquid ejection device according to a fourth aspect of the present disclosure is directed to the first or second aspect, and further includes: a solvent storage configured to store the solvent; a cleaning agent storage configured to store the cleaning agent; and a mixing unit coupled to the solvent storage and the cleaning agent storage and configured to mix the solvent and the cleaning agent, in which the liquid transport tube transports the liquid from the mixing unit to the head unit.

According to this aspect, the solvent storage, the cleaning agent storage, and the mixing unit are provided, and the liquid transport tube transports the liquid from the mixing unit to the head unit. With such a configuration, a mixing ratio of the solvent to the cleaning agent can be easily changed. For example, the cleaning agent can be mixed with the solvent immediately before ejection from the head unit, and residue of the cleaning agent in the device can be reduced.

The liquid ejection device according to a fifth aspect of the present disclosure is directed to the fourth aspect, and further includes: a controller configured to control a mixing ratio of the solvent to the cleaning agent to be mixed in the mixing unit, in which the controller is configured to control an ejection amount of the liquid from the head unit, and change the mixing ratio according to the ejection amount.

According to this aspect, the ejection amount of the liquid can be controlled, and the mixing ratio of the solvent to the cleaning agent is changed according to the ejection amount. Therefore, a suitable mixing ratio can be automatically set according to the ejection amount of the liquid.

The liquid ejection device according to a sixth aspect of the present disclosure is directed to the fourth aspect, and further includes: a pump provided between the solvent storage and the head unit, and configured to supply the solvent from the solvent storage to the head unit, in which the mixing unit is provided between the pump and the head unit.

According to this aspect, the mixing unit is provided between the pump and the head unit. Therefore, since the cleaning agent is not mixed into the pump, residue of the cleaning agent in the pump can be reduced, and maintenance of the pump becomes easy.

The liquid ejection device according to a seventh aspect of the present disclosure is directed to the first or second aspect, in which the head unit has at least one nozzle, and a hole diameter of the nozzle is 0.01 mm or more and 0.15 mm or less.

According to this aspect, the hole diameter of the nozzle is 0.01 mm or more and 0.15 mm or less. With such a hole diameter, the liquid can be suitably ejected when the liquid is ejected from the head unit in the a continuous flow and the continuous flow is converted into droplets to collide with the object in the form of droplets.

The liquid ejection device according to an eighth aspect of the present disclosure is directed to the first or second aspect, in which an ejection amount of the liquid from the head unit is 1 ml/min or more and 25 ml/min or less.

According to this aspect, the ejection amount of the liquid is 1 ml/min or more and 25 ml/min or less. With such an ejection amount of the liquid, the liquid can be suitably ejected when the liquid is ejected in the continuous flow from the head unit and the continuous flow is converted into droplets to collide with the object in the form of droplets.

The liquid ejection device according to a ninth aspect of the present disclosure is directed to the first or second aspect, in which an ejection pressure of the liquid from the head unit is 0.5 MPa or more and 3.0 MPa or less.

According to this aspect, an ejection pressure of the liquid is 0.5 MPa or more and 3.0 MPa or less. With such an ejection pressure of the liquid, the liquid can be suitably ejected when the liquid is ejected in the continuous flow from the head unit and the continuous flow is converted into droplets to collide with the object in the form of droplets.

First Embodiment

Hereinafter, embodiments of the present disclosure will be described with reference to the accompanying drawings. First, an overview of a liquid ejection device 1 according to a first embodiment of the present disclosure will be described with reference to FIG. 1. The liquid ejection device 1 shown in FIG. 1 includes a head unit 2 having nozzles 27, a liquid storage 8 that stores a liquid 3 to be ejected, a liquid transport tube 7 that couples the head unit 2 and the liquid storage 8, a liquid supply unit 6 including a pump or the like, and a controller 5 including a control signal line 52 extending to the liquid supply unit 6.

A user uses the liquid ejection device 1 having such a configuration to eject the liquid 3 from the nozzles 27 of the head unit 2 and cause the liquid 3 to collide with a desired object, thereby cleaning an attached matter attached to the object. The liquid ejection device 1 according to the embodiment is a liquid ejection device in which a continuous flow **3*a* of the liquid 3 ejected in a continuous state in a direction b from a plurality of nozzles 27 provided in the head unit 2 is caused to collide with the object of droplets 3*b* in a state of being converted into droplets 3*b***.

As described above, the liquid ejection device 1 according to the embodiment includes the liquid storage 8 that stores the liquid 3 as an ejection liquid, the liquid supply unit 6 that feeds the liquid 3, the controller 5 that controls an operation of the liquid supply unit 6, and the head unit 2. A flexible resin material or the like is used for the liquid transport tube 7 as a liquid feed flow path coupling the liquid storage 8 to the head unit 2, whereby handling properties can be improved.

A hole diameter of each of the nozzles 27 provided in the head unit 2 is in a range of 0.01 mm or more and 0.15 mm or less, and by reducing the hole diameter of the nozzle 27, an enormous liquid feed amount is not required, and household products such as kitchen products and sanitary articles can be cleaned with a small liquid feed amount. The liquid supply unit 6 is driven under control of the controller 5, and feeds the liquid 3 at a predetermined pressure or a predetermined flow rate. The pressure or the flow rate can be changed as desired by the user inputting an instruction to the controller 5.

Here, the liquid 3 contains water as a solvent and a cleaning agent having a predetermined concentration. Water can be preferably used as the solvent, and a surfactant can be preferably used as the cleaning agent. A concentration of the cleaning agent is preferably 1% by weight or more, and more preferably 18 by weight or more and 10% by weight or less. The liquid 3 according to the embodiment also contains a cleaning agent having a predetermined concentration of 1% by weight or more and 10% by weight or less. Examples of the cleaning agent include any one or more of a carboxylate, a sulfonate, a sulfate ester salt, an amine oxide, a phosphate ester salt, an alkyl glycoside, an alkyl glycerol, an alkylhydroxysulfobetaine, which is a typical example of an amphoteric surfactant, sodium dialkylsulfosuccinate, and a polyoxyethylene alkyl ether, which is a representative example of a nonionic surfactant.

The solvent and the cleaning agent are not particularly limited, and the cleaning agent may be any substance as long as the substance has a higher cleaning power for cleaning the attached matter attached to the object than the solvent. Whether the cleaning agent has the higher cleaning power for cleaning the attached matter attached to the object than the solvent can be determined based on a comparison between a cleaning effect obtained when the liquid 3 containing the cleaning agent in the solvent is ejected and a cleaning effect obtained when only the solvent is ejected under the same ejection conditions.

As described above, the liquid ejection device 1 according to the embodiment includes the head unit 2 that ejects the liquid 3 and the liquid transport tube 7 that transports the liquid 3 to the head unit 2. The liquid 3 contains water as an example of the solvent, and the cleaning agent having the stronger cleaning power for cleaning the attached matter attached to the object than the solvent. Here, the content of the cleaning agent in the liquid 3 is 1% by weight or more. The liquid ejection device 1 according to the embodiment is a liquid ejection device in which the liquid 3 is ejected from the head unit 2 in the continuous flow 3*a*, and the continuous flow 3*a* is converted into droplets to collide with the object in a form of the droplets 3*b*.

As described above, in the liquid ejection device 1 according to the embodiment, the liquid 3 is ejected from the head unit 2 in the continuous flow 3*a*, and the continuous flow 3*a* is converted into droplets to collide with the object in the form of the droplets 3*b*. The liquid 3 contains 1% by weight or more of the cleaning agent. An ejection amount of the liquid 3 can be limited by adopting such a liquid ejection device 1, and further, a cleaning effect can be improved by containing 18 by weight or more of the cleaning agent in the liquid 3.

As described above, in the liquid ejection device 1 according to the embodiment, the content of the cleaning agent in the liquid 3 is 10% by weight or less. That is, the content of the cleaning agent in the liquid 3 according to the embodiment is 1% by weight or more and 10% by weight or less. The cleaning effect increases when the content of the cleaning agent is 18 by weight or more, but an effect of further improving the cleaning effect becomes lower once the content of the cleaning agent is more than 10% by weight. On the other hand, when the content of the cleaning agent is 10% by weight or less, it is possible to prevent a decrease in workability due to easiness of foaming caused by containing more than 10% by weight of the cleaning agent, an increase in a cost of the liquid 3, and the like.

As described above, the liquid ejection device 1 according to the embodiment includes the liquid storage 8 that stores the liquid 3, and the liquid transport tube 7 transports the liquid 3 from the liquid storage 8 to the head unit 2. With such a configuration, a device configuration of the liquid ejection device 1 can be simplified, and an increase in a manufacturing cost of the liquid ejection device 1 or the like can be prevented.

As described above, the liquid ejection device 1 according to the embodiment includes the head unit 2 having the plurality of nozzles 27. The head unit 2 has the plurality of nozzles 27, and the hole diameter of each of the nozzles 27 is 0.024 mm. Here, the hole diameter of the nozzle 27 is preferably 0.01 mm or more and 0.15 mm or less. With such a hole diameter, the liquid 3 can be suitably ejected when the liquid 3 is ejected from the head unit 2 in the continuous flow 3*a* and the continuous flow 3*a* is converted into droplets to collide with the object in the form of droplets 3*b*. Although the head unit 2 according to the embodiment has the plurality of nozzles 27, the number of the nozzles 27 is not particularly limited, and one nozzle 27 may be provided.

Hereinafter, a result of verifying an effect of addition of the cleaning agent by ejecting the liquid 3 in which the cleaning agent is added to water toward the object by the liquid ejection device 1 will be described with reference to FIG. 2. For the verification, the liquid ejection device 1 including the head unit 2 in which the hole diameter of the nozzle 27 was 0.024 mm and which was capable of ejecting the liquid 3 was used. A mixed liquid obtained by adding 10% by weight of a commercially available cleaning liquid to pure water was used as the liquid 3 as the ejection liquid, and cleaning performance was compared between a case where only pure water was ejected and a case where the mixed liquid obtained by adding 10% by weight of the commercially available cleaning liquid was ejected.

Specifically, a commercially available peanut butter was applied to a region of 5 cm square on a commercially available wood chopping board, and the peanut butter was evaluated as an object to be cleaned.

Specifically, ejection pressure conditions were changed among four conditions of 0.5 MPa, 0.7 MPa, 1 MPa, and 3 MPa, and after ejecting with the liquid ejection device 1 for 60 seconds under each condition, a degree of contamination removal was evaluated based on a measured value of a relative light unit (RLU) using a Lumitester Smart manufactured by Kikkoman Biochemifa. According to description of handling of the product, the commercially available cleaning liquid was sprayed onto an area to be removed and left for 60 seconds, followed by rinsing with running water.

Figure 2:
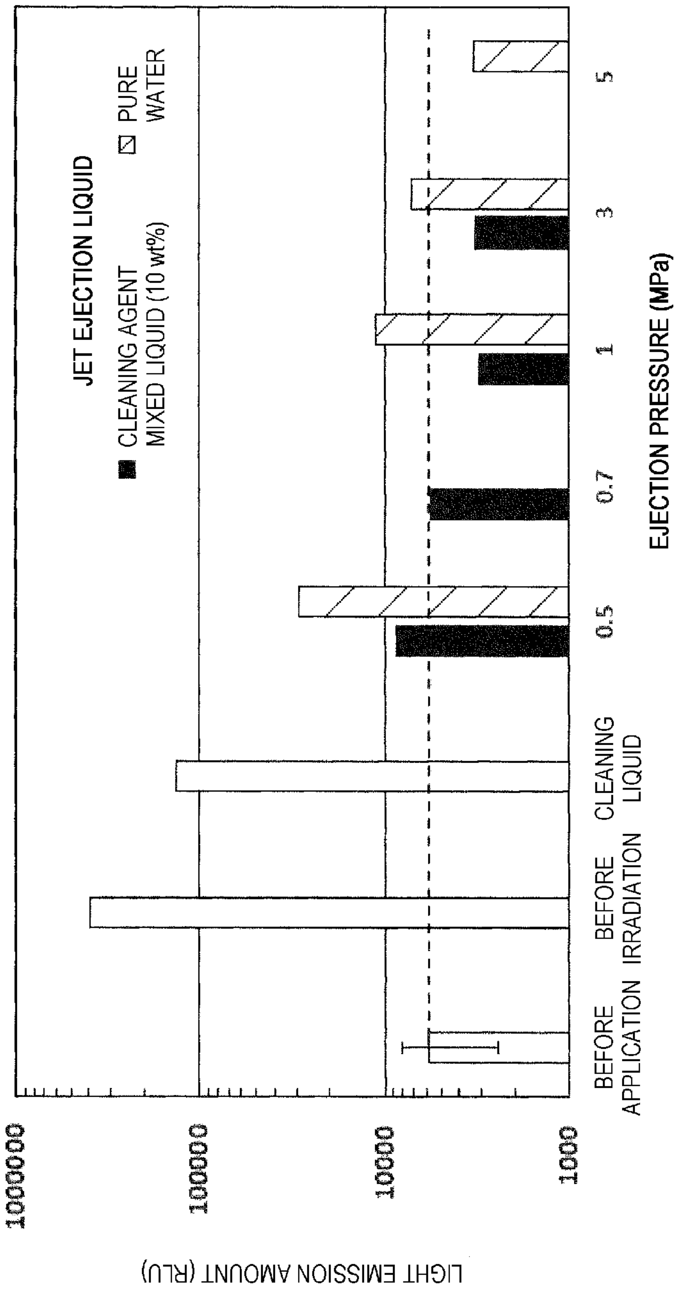
FIG. 2 is a graph showing a cleaning effect obtained by using the liquid ejection device according to the first embodiment.

A graph in FIG. 2 shows evaluation results of the above evaluation, in which a horizontal axis represents cleaning conditions, and a vertical axis represents a light emission amount obtained by using the Lumitester Smart manufactured by Kikkoman Biochemifa (hereinafter referred to as a Lumitester light emission amount). FIG. 2 shows a relative light emission amount under each of the above conditions. FIG. 2 indicates that the larger the light emission amount is, the more the peanut butter cannot be removed from the chopping board, and thus the chopping board is more contaminated by the peanut butter. An average value of the Lumitester light emission amounts indicating contamination of the chopping board before application of the peanut butter, which is a result on a leftmost side in FIG. 2, is approximately 6000 RLU. FIG. 2 shows a comparison result of an effect of removing the peanut butter under each test condition based on a value of approximately 6000 RLU.

A second result from a left side in FIG. 2, that is, the Lumitester light emission amount after the application of the peanut butter, is as high as approximately 400000 RLU. Thereafter, when cleaning was performed according to the description of the handling of the product using the commercially available cleaning liquid, as shown in a third result from the left side in FIG. 2, the Lumitester light emission amount decreases to approximately 130000 RLU, but does not return to a state before the application.

On the other hand, in cleaning using pure water when the ejection pressure is 0.5 MPa, 1 MPa, 3 MPa, and 5 MPa, the contamination can be removed to the state before the application when the ejection pressure is approximately 3 MPa or more. In cleaning using the mixed liquid to which the cleaning liquid is added when the ejection pressure is 0.5 MPa, 0.7 MPa, 1 MPa, and 3 MPa, the contamination can be removed up to the state before the application when the ejection pressure is 0.7 MPa or more, and the contamination can be removed up to a state close to the state before the application even when the ejection pressure is 0.5 MPa. Even when the ejection pressure is 0.5 MPa, a cleaning effect is significantly higher than that when cleaning was performed according to the description of the handling of the product using the commercially available cleaning liquid. From the above, it is considered that by ejecting the liquid 3 containing the cleaning agent onto the object in the form of droplets, an impact pressure and a shearing force of the droplets 3*b* activate a cleaning action of the cleaning agent, promote emulsification of the object to be removed, and improve cleaning efficiency.

Figure 3:
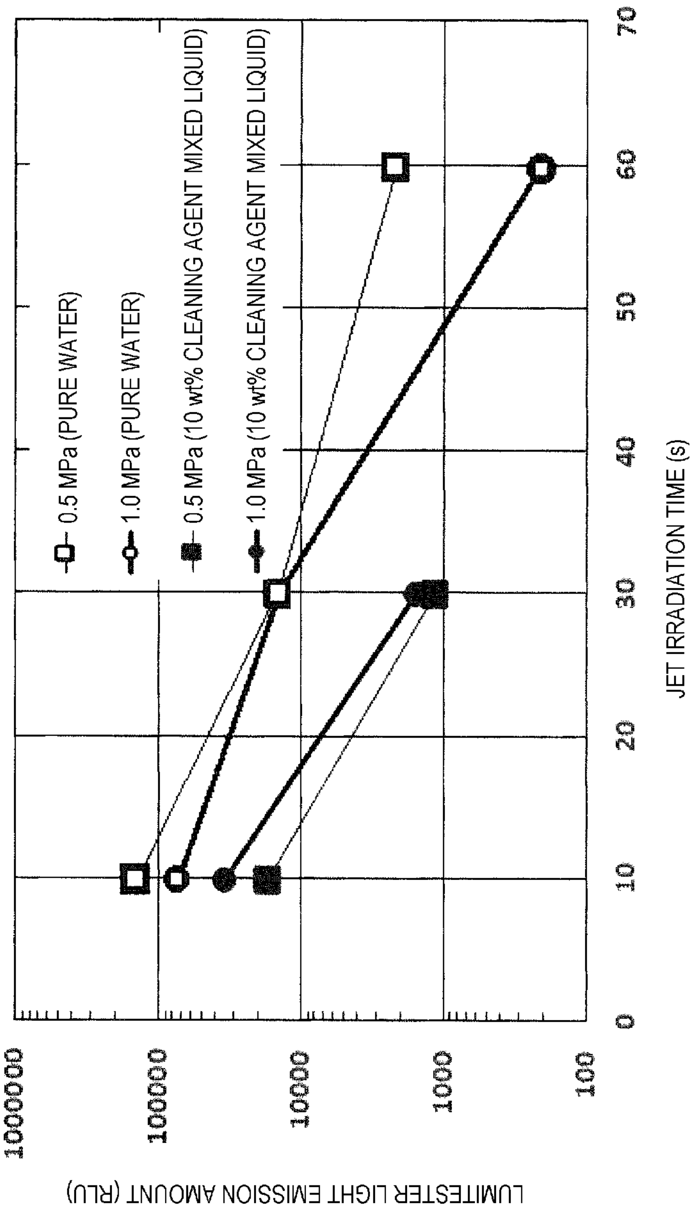
FIG. 3 is a graph showing an effect of adding a cleaning agent using the liquid ejection device according to the first embodiment.

FIG. 3 further shows other evaluation results of a cleaning effect for an object to be removed when a mixed liquid obtained by adding a cleaning agent to pure water is used as an ejection liquid. In FIG. 3, a horizontal axis represents a jet irradiation time, which is a time during which the ejection liquid is ejected onto the object in a form of droplets, and a vertical axis represents a Lumitester light emission amount. FIG. 3 shows a result of comparing Lumitester light emission amounts corresponding to contamination of the peanut butter on the chopping board for each jet irradiation time between a case where pure water is used and a case where a mixed liquid containing 10% by weight of the cleaning agent is used as the ejection liquid. As shown in FIG. 3, by adding the cleaning agent, when the liquid 3 is ejected for 30 seconds in both cases where the ejection pressure is 0.5 MPa and 1.0 MPa, the Lumitester light emission amount for the mixed liquid is approximately 1/10 of the Lumitester light emission amount for the pure water, and it can be seen that the cleaning effect is remarkably improved by adding the cleaning agent to pure water.

Figure 4:
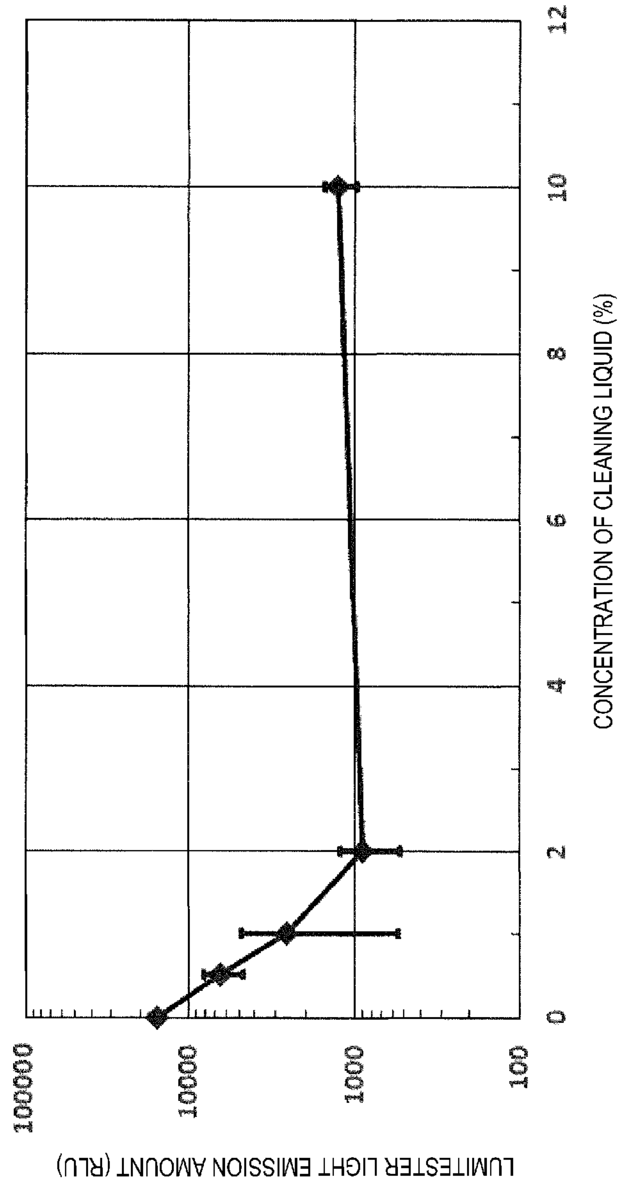
FIG. 4 is a graph showing a correlation between an amount of adding the cleaning agent and the cleaning effect using the liquid ejection device according to the first embodiment.

A concentration of the cleaning agent with which the cleaning effect is particularly improved will be described with reference to FIG. 4. In FIG. 4, a horizontal axis represents the concentration of the cleaning agent, and a vertical axis represents the Lumitester light emission amount. As shown in FIG. 4, it can be seen that even when the concentration of the cleaning agent is reduced to 2.0% by weight, cleaning performance does not deteriorate as compared with a case where the concentration of the cleaning agent is 10.0% by weight. It is also found that the cleaning performance is high even when the concentration of the cleaning agent is 1.0% by weight. An amount of the cleaning agent used when the cleaning agent is ejected at a concentration of 2.0% by weight and an ejection pressure of 1 MPa for 60 seconds is 0.25 ml in terms of a stock solution, and an amount of the cleaning agent used is reduced to approximately 1/4 of 0.90 ml, which is an amount of the cleaning agent used in general according to the description of the handling of the product.

It is preferable that the ejection amount of the liquid 3 from the head unit 2 is adjusted to be 1 ml/min or more and 25 ml/min or less. As a result of intensive studies by the inventors, it has been found that, with such an ejection amount of the liquid 3, the liquid 3 can be suitably ejected when the liquid 3 is ejected from the head unit 2 in the continuous flow 3*a* and the continuous flow 3*a* is converted into droplets to collide with the object in the form of droplets 3*b*.

The ejection pressure of the liquid 3 from the head unit 2 is preferably adjusted to 0.5 MPa or more and 3.0 MPa or less. As a result of intensive studies by the inventors, it has been found that, with such an ejection pressure of the liquid 3, the liquid 3 can be suitably ejected when the liquid 3 is ejected from the head unit 2 in the continuous flow 3*a* and the continuous flow 3*a* is converted into droplets to collide with the object in the form of droplets 3*b*.

Second Embodiment

Figure 5:
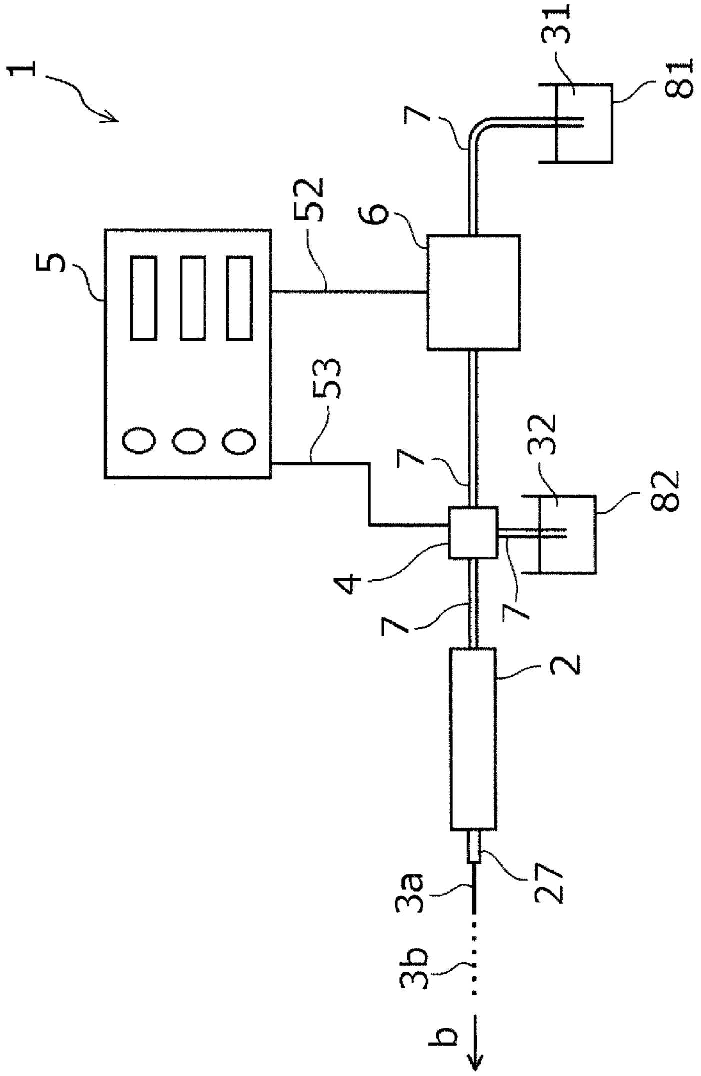
FIG. 5 is a schematic diagram showing a liquid ejection device according to a second embodiment.

Hereinafter, the liquid ejection device 1 according to a second embodiment will be described with reference to FIG. 5. FIG. 5 is a diagram corresponding to FIG. 1 showing the liquid ejection device 1 according to the first embodiment. The liquid ejection device 1 according to the embodiment is the same as the liquid ejection device 1 according to the first embodiment except for a configuration to be described below. Therefore, the liquid ejection device 1 according to the embodiment has the same features as those of the liquid ejection device 1 according to the first embodiment except for the following description, for example, a configuration of the head unit 2, and an ejection amount and an ejection pressure of the liquid 3. Therefore, in FIG. 5, the same components as those according to the first embodiment are denoted by the same reference numerals, and detailed description thereof will be omitted.

As described above, the liquid ejection device 1 according to the first embodiment has a configuration in which the liquid 3 obtained by mixing the cleaning agent with water as the solvent in advance is stored in the liquid storage 8 and used as the ejection liquid. On the other hand, as shown in FIG. 5, the liquid ejection device 1 according to the embodiment includes a solvent storage 81 that stores water as a solvent 31, and a cleaning agent storage 82 that stores the cleaning agent 32. The liquid ejection device 1 according to the embodiment includes, between the liquid supply unit 6 and the head unit 2, a mixing unit 4 that is coupled to the solvent storage 81 and the cleaning agent storage 82 via the liquid transport tubes 7, and that mixes water as the solvent 31 and the cleaning agent 32 to generate the liquid 3. The liquid transport tube 7 transports the liquid 3 from the mixing unit 4 to the head unit 2. Since the liquid ejection device 1 according to the embodiment has such a configuration, a mixing ratio of the solvent 31 to the cleaning agent 32 can be easily changed. For example, the cleaning agent 32 can be mixed with the solvent 31 immediately before ejection from the head unit 2, and residue of the cleaning agent in the device can be reduced.

In the liquid ejection device 1 according to the embodiment, the controller 5 is coupled to the mixing unit 4 by a control signal line 53. The controller 5 can control the mixing ratio of the solvent to the cleaning agent to be mixed in the mixing unit 4, control the ejection amount of the liquid 3 from the head unit 2, and change the mixing ratio of the solvent 31 to the cleaning agent 32 according to the ejection amount of the liquid 3. Therefore, the liquid ejection device 1 according to the embodiment can automatically set a suitable mixing ratio according to the ejection amount of the liquid 3.

Specifically, the controller 5 can supply and stop supply of the cleaning agent 32 by managing a supply amount of the cleaning agent 32 to the mixing unit 4 via the liquid transport tube 7, and can also change the supply amount. For example, the controller 5 controls the supply of the cleaning agent 32 to the mixing unit 4 by opening and closing an electromagnetic valve (not shown) or driving a linear switch (not shown) based on a signal to the liquid supply unit 6, whereby the supply amount of the cleaning agent 32 can be adjusted according to a liquid feed amount of the solvent 31 so as to achieve a preferable cleaning agent concentration set in advance based on a state of contamination of an object to be cleaned. In the embodiment, one controller 5 plays both a role of controlling the liquid supply unit 6 and a role of controlling the mixing unit 4, but a controller for controlling the liquid supply unit 6 and a controller for controlling the mixing unit 4 may be separately provided.

Although water can be mainly used as the solvent to be stored in the solvent storage 81, a dedicated cleaning liquid or the liquid 3 in which the cleaning agent 32 is mixed in advance may be used as a liquid to be stored in the solvent storage e 81 according to a contamination component, a cleaning area, and the like of the object to be cleaned, and in this case, the supply of the cleaning agent 32 from the cleaning agent storage 82 may be always stopped. With such a configuration, by replacing the liquid to be stored in the solvent storage 81, when ejection of the liquid 3 containing the cleaning agent 32 is switched to ejection of only water not containing the cleaning agent 32 at a stage where the object to be cleaned is emulsified, the object to be cleaned can be washed away with a water flow, and as a result, residue of a cleaning agent component can be prevented from remaining on an ejection surface due to drying, and a water saving effect can be improved.

In the liquid ejection device 1 according to the embodiment, the liquid supply unit 6 that supplies the solvent 31 from the solvent storage 81 to the head unit 2 is provided between the solvent storage 81 and the head unit 2, and the mixing unit 4 is provided between the liquid supply unit 6 and the head unit 2. Therefore, since the cleaning agent 32 is not mixed into the liquid supply unit 6, residue of the cleaning agent 32 in the liquid supply unit 6 can be reduced, and maintenance of the liquid supply unit 6 becomes easy.

In other words, in the liquid ejection device 1 according to the embodiment, since the cleaning agent storage 82 is disposed between the liquid supply unit 6 and the head unit 2, a component of the cleaning agent 32 does not adhere to the liquid supply unit 6, and thus it is not necessary to flow a large amount of water for cleaning the inside of the liquid supply unit 6, whereby it is possible to avoid problems and failures of the liquid supply unit 6, facilitate maintenance and storage in an appropriate state, and improve the water saving effect.

In a configuration of the embodiment as well, similarly to the liquid ejection device 1 according to the first embodiment, when the liquid 3 in which the cleaning agent 32 is mixed is ejected to the object, and peanut butter applied to a region of 5 cm square on a chopping board is an object to be cleaned, contamination can be removed up to a state before application at an ejection pressure of 0.7 MPa, and a cleaning effect is higher than that of the commercially available cleaning liquid even at an ejection pressure of 0.5 MPa. These ejection pressures of 0.5 MPa to 0.7 MPa are within a range of tap water pressure, and when a flow path through which water as the solvent 31 flows is coupled to a faucet of general tap water, it is not necessary to separately prepare the liquid supply unit 6, and efficient cleaning using the liquid ejection device 1 can be easily performed. In a case of coupling to tap water, a flow meter may be disposed in the liquid transport tube 7, which is a flow path of the liquid 3, to measure a liquid feed amount, and a supply amount of the cleaning agent 32 may be changed based on the measured value.

The present disclosure is not limited to the above-described embodiments, and can be implemented by various configurations without departing from the scope of the present disclosure. Technical features in the embodiments corresponding to technical features in the aspect described in Summary can be replaced or combined as appropriate in order to solve a part or all of the problems described above, or to achieve a part or all of the effects described above. The technical features can be deleted as appropriate unless described as essential in the present specification.

What is claimed is:

1. A liquid ejection device comprising:

a head unit having at least one nozzle and configured to eject a liquid containing a solvent and a cleaning agent from the nozzle;

a liquid transport tube configured to transport the liquid to the head unit;

a solvent storage configured to store the solvent;

a cleaning agent storage configured to store the cleaning agent; and a mixing unit coupled to the solvent storage and the cleaning agent storage and configured to mix the solvent and the cleaning agent, wherein, the liquid transport tube transports the liquid from the mixing unit to the head unit, a content of the cleaning agent in the liquid is 1% by weight or more, and the liquid is ejected from the head unit in a continuous flow that subsequently breaks up into droplets.

2. The liquid ejection device according to claim 1, wherein the content of the cleaning agent in the liquid is 10% by weight or less.

3. The liquid ejection device according to claim 2, further comprising:

a liquid storage configured to store the liquid, wherein the liquid transport tube transports the liquid from the liquid storage to the head unit.

4. The liquid ejection device according to claim 1, further comprising:

a liquid storage configured to store the liquid, wherein the liquid transport tube transports the liquid from the liquid storage to the head unit.

5. The liquid ejection device according to claim 1, further comprising:

a controller configured to control a mixing ratio of the solvent to the cleaning agent to be mixed in the mixing unit, wherein the controller is configured to control an ejection amount of the liquid from the head unit, and change the mixing ratio according to the ejection amount.

6. The liquid ejection device according to claim 1, further comprising:

a pump provided between the solvent storage and the head unit, and configured to supply the solvent from the solvent storage to the head unit, wherein the mixing unit is provided between the pump and the head unit.

7. The liquid ejection device according to claim 1, wherein a hole diameter of the nozzle is 0.01 mm or more and 0.15 mm or less.

8. The liquid ejection device according to claim 1, wherein an ejection amount of the liquid from the head unit is 1 ml/min or more and 25 ml/min or less.

9. The liquid ejection device according to claim 1, wherein an ejection pressure of the liquid from the head unit is 0.5 MPa or more and 3.0 MPa or less.

* * * * *